United States Patent [19]

Kalsi et al.

[11] Patent Number: 4,614,330
[45] Date of Patent: Sep. 30, 1986

[54] NON-LOCKING TAPERED PLUG VALVE

[75] Inventors: Manmohan S. Kalsi; Clemens L. Horst, both of Houston, Tex.

[73] Assignee: Empresas Lanzagorta, S.A. de C.V., Mexico

[21] Appl. No.: 774,145

[22] Filed: Sep. 9, 1985

[51] Int. Cl.[4] .......................... F16K 5/02; F16K 5/16
[52] U.S. Cl. .................................. 251/283; 251/309; 137/614.17
[58] Field of Search .................. 137/614.17; 251/283, 251/309, 312

[56] References Cited

U.S. PATENT DOCUMENTS

| 619,594 | 2/1899 | Martin | 251/283 X |
|---|---|---|---|
| 2,045,113 | 6/1936 | Ward | 251/312 X |
| 2,954,961 | 10/1960 | Stogner et al. | 251/312 |
| 3,115,151 | 12/1963 | Manor et al. | 251/283 X |
| 4,034,776 | 7/1977 | Eshgly | 251/283 X |
| 4,135,544 | 1/1979 | MacLeod | 251/309 X |
| 4,174,092 | 11/1979 | MacLeod | 251/283 X |

Primary Examiner—A. Michael Chambers
Assistant Examiner—John C. Fox
Attorney, Agent, or Firm—Gunn, Lee & Jackson

[57] ABSTRACT

A non-locking tapered plug valve is provided which prevents taper locking of the plug member by ensuring against pressure responsive plug movement toward the small extremity thereof due to positive or negative hydraulic pressure transients. The chambers at each axial extremity of the plug member are of such volumetric relation during positive pressure transients that the chamber at the small extremity of the plug reaches equilibrium with flow passage pressure before the chamber at the large extremity of the plug member thus ensuring that any pressure responsive resultant force acting on the plug member is directed toward its large extremity. To avoid taper locking during a negative pressure transient, an equalization passage with a check valve is provided to permit unidirectional flow from the large extremity of the valve chamber to the main flow passage. This allows a quicker equalization of pressure between the large extremity of the valve chambers with line pressure, whereas the higher pressure in the small extremity of the valve chamber creates a force on the plug member away from the taper locking direction.

16 Claims, 5 Drawing Figures

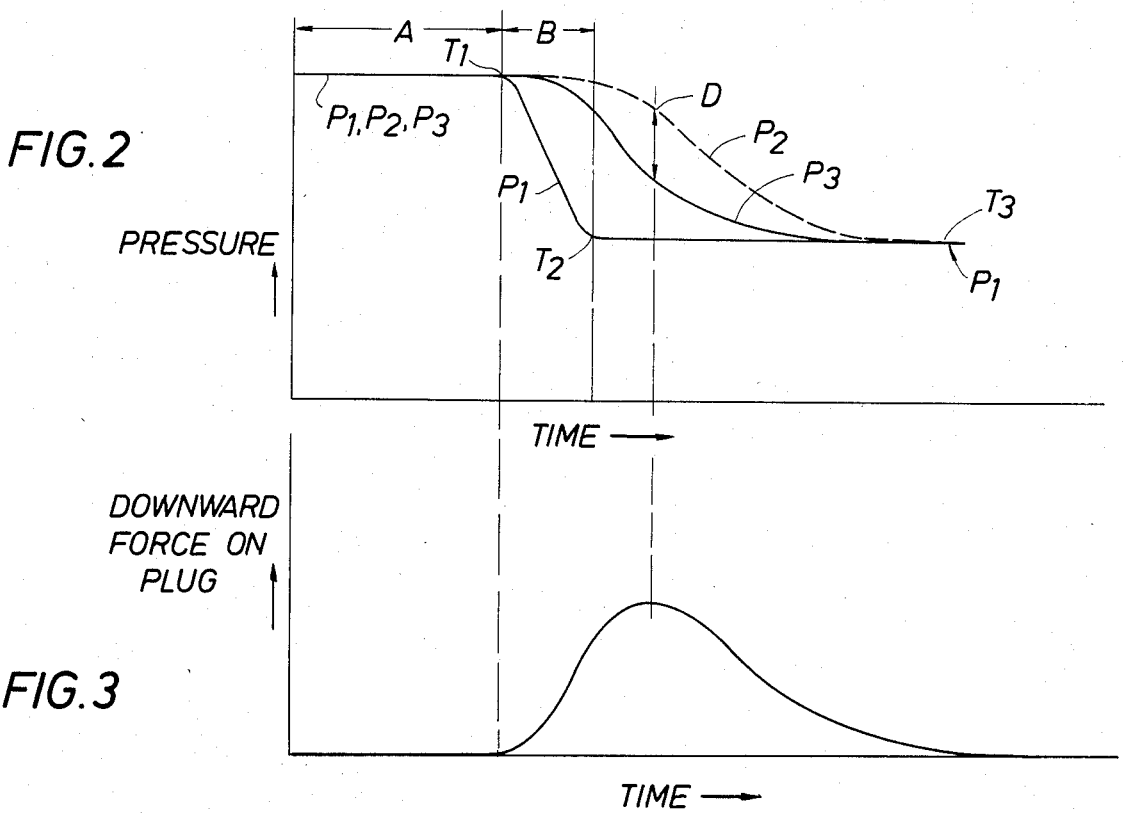
PRESSURE DISTRIBUTION AND FORCE/TIME HISTORIES
DURING NEGATIVE PRESSURE TRANSIENT
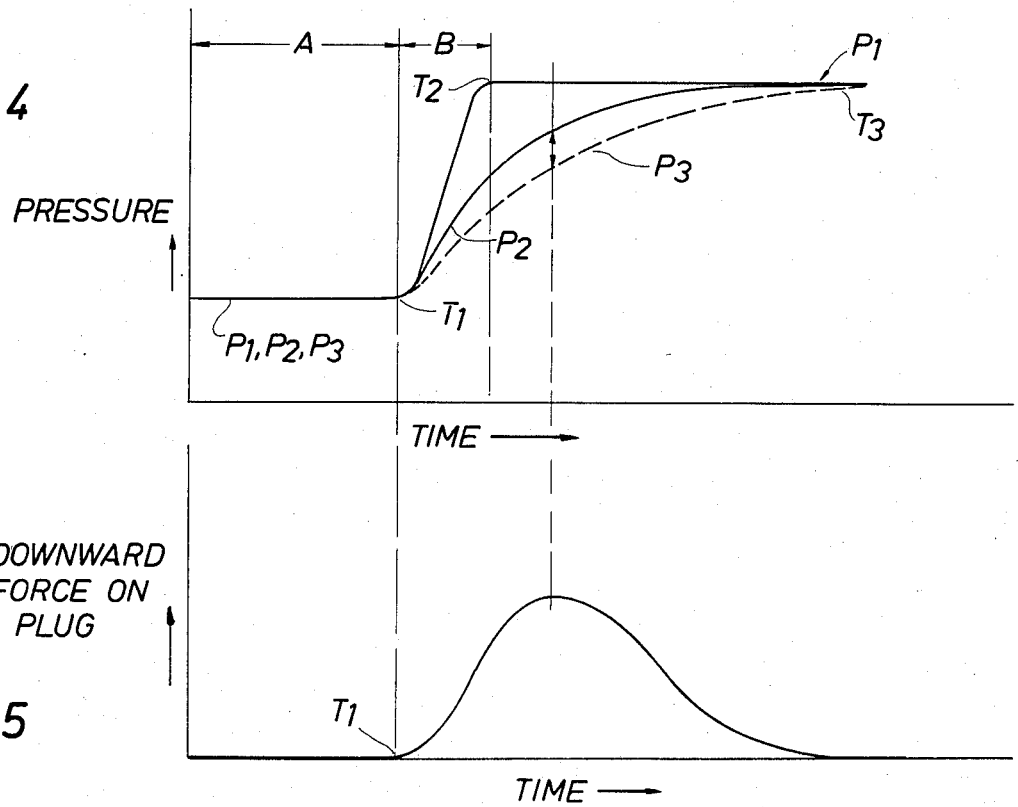
PRESSURE DISTRIBUTION AND FORCE/TIME HISTORIES
DURING POSITIVE PRESSURE TRANSIENT

NON-LOCKING TAPERED PLUG VALVE

FIELD OF THE INVENTION

This invention relates generally to tapered plug valves which are utilized for controlling the flow of fluids through flow lines. More specifically, the present invention is directed to a plug valve mechanism which effectively prevents pressure locking of the plug member in the body cavity of the valve by the effects of positive and negative pressure transients and prevents locking of the plug member by the effects of temperature transients.

BACKGROUND OF THE DISCLOSURE

Various types of plug valves, such as cylindrical plug valves, ball valves and tapered plug valves have been utilized for a significant period of time. Tapered plug valves are favored in many service conditions because of the closeness of fit that can be obtained between the tapered plug member and the tapered valve chamber surfaces. Tapered plug valves offer the capability for achieving close sealing tolerances without the introduction of significant torque to achieve valve operation. Tapered plug valves are available in lubricated models where sealant material provides for lubrication of internal components and assists in the sealing activity of the valve. The injected lubricant minimizes leakage in the clearance between the tapered plug member and the internal tapered sealing surface of the valve body. Tapered plug valves are also available in non-lubricated models where sealing is affected by the closeness of fit between the plug and body surface.

Tapered plug valves are at times disadvantageous because pressure induced locking may occur especially under the influence of positive and negative pressure transient conditions. In cases where surges in line pressure occur or where line pressure suddenly increases or decreases, the tapered plug member can be moved axially under pressure influence to a tightly wedged position within the apex tapered portion of the valve chamber. In this tightly wedged position, rotation of the plug member may not be possible or excessive torque may be required to move the plug member between its open and closed positions. The relationship of the plug member to internal valve chamber walls typically defines chambers at each axial end of the plug members. When line pressure changes occur, a pressure differential exists between these internal chambers which becomes balanced at the end of a "transient period." The transient period is that period of time during which there is a transfer of fluid through the clearances between the plug and body to the internal chambers due to the pressure differential. Pressure transients are "positive" when line pressure increases causing leakage flow from the flow passage to the internal chambers and "negative" when line pressure decreases, causing leakage flow from the internal chambers to the flow passage. It is desirable therefore to provide means for preventing pressure responsive movement of the plug member to a locked position within the valve chamber during either positive or negative pressure transients.

As temperature transients occur the valve body may increase in effective dimension thereby enabling the tapered plug member to move further towards the small end of the valve chamber. Upon subsequent decrease in valve chamber dimension, caused by cooling by the valve body, the valve chamber surfaces of the valve body may seize the plug the lock it against rotation. It is desirable of course to eliminate the possibility of plug movement toward its apex and thus prevent locking of the plug member due to the effects of temperature transients.

Taper locking can also occur under circumstances where the valve is mounted with the large base portion of the plug member positioned above the small apex portion of the plug. The weight of the plug can cause it to descent toward its taper apex by gravitational force and in time it can become locked against normal rotation.

PRIOR ART

Various valve improvements have been introduced to minimize the effects of hydraulic locking in tapered plug valves. One such improvement is identified in U.S. Pat. No. 4,034,776 of Eshghy which discloses a tapered plug member defining a passage communicating the large end of the valve chamber with the flow passage of the valve. An opposing passage is also provided in the plug member which is closed by a free-floating ball check member 110 which prevents lubricant material flow from chamber 76 to the flow passage of the valve. A spring member also urges the tapered plug member towards its large extremity. U.S. Pat. No. 4,135,544 of MacLeod discloses a balanced tapered plug valve wherein the pressure responsive area at the small end of the plug member is greater than the pressure responsive area at the large end. A resultant force is therefore developed during the negative transient which urges the plug member towards its large end. U.S. Pat. No. 4,174,092 discloses a tapered plug valve having a passage 98 in the plug member which balances pressure of chamber 78 with the flow passage of the valve. Also, the valve stem is urged by body pressure to a position compressing the stem seal 27. The plug of this valve is not positively biased in a definite pressure responsive direction. Rather, the valve is of pressure balanced design and the plug member is not generally movable to a locked position responsive to pressure transients. The plug, however, is sensitive to minute pressure differential and therefore is susceptible to axial shifting back and forth during period of pressure transient induced forces. The prior art patents noted above do not disclose tapered plug valve apparatus having the capability of preventing plug locking responsive to both positive and negative hydraulic pressure transients.

SUMMARY OF THE INVENTION

It is therefore a primary feature of this invention to provide a novel tapered plug valve mechanism having a favorable pressure responsive bias toward the large extremity thereof during both positive and negative pressure transients thus obviating any possibility of pressure locking of the plug member.

It is also an important feature of the present invention to provide a novel tapered plug valve mechanism which prevents pressure responsive movement of the tapered plug member toward the taper apex of the valve chamber responsive to both positive and negative pressure transients.

It is also a feature of this invention to provide a novel tapered plug valve mechanism of the lubricated or non-lubricated type which employs pressure responsive means generating a favorable force bias during positive and negative pressure transients which urges the tapered plug member toward its large or base extremity.

It is also a feature of this invention to provide a novel tapered plug valve mechanism which prevents tapered plug movement toward the taper apex of the valve chamber during conditions of temperature transients, thereby effectively preventing plug locking as the valve chamber dimension decreases responsive to temperature change.

It is an even further feature of this invention to provide a novel tapered plug valve mechanism which is not subject to plug locking when the valve is installed with the large end of the plug member located above the small, taper apex end of the plug member which might otherwise permit gravitational movement of the plug member into the apex taper of the valve chamber to a position where the possibility of taper locking can occur.

The foregoing and other features and advantages of this invention are attained by a non-locking tapered plug valve mechanism incorporating a tapered plug member rotatably mounted within a corresponding tapered valve chamber defined within a valve body. The plug member defines a passage communicating the flow passage of the valve with a chamber at the large or base extremity of the plug member. This pressure balancing passage is provided with a check valve permitting unidirectional flow from the base chamber to the flow passage and preventing flow from the flow passage to the base chamber. The check valve is urged by a compression spring into seated relation with a valve seat defined within the passage. The valve mechanism also incorporates a compression spring system mechanically urging the plug member toward the large or base extremity thereof.

When a negative pressure transient occurs due to rapid decrease in flow passage pressure, pressure within the base chamber at the large end of the plug member is vented past the check valve into the flow passage thereby preventing pressure induced movement of the plug member toward its apex extremity. Pressure within the apex extremity of the valve chamber at the small end of the plug member maintains a favorable force bias urging the plug member toward its large extremity, away from a possible taper locking position.

Positive pressure transients due to sudden increase in line pressure acting upon differential plug areas, larger at the large extremity of the plug member, develop a resultant force urging the plug member toward its large extremity again away from a possible taper locking condition. Additionally, the relative volumetric dimensions of the base chamber and apex chamber are so correlated with the clearance areas between the plug and body such that the apex chamber becomes equalized with line pressure before equalization of the base chamber during a positive line pressure transient. This ensures that the only pressure induced resultant force acting upon the plug member will be a favorable force bias in a direction toward the base extremity of the tapered plug member.

BRIEF DESCRIPTION OF THE DRAWINGS

So that the manner in which the above recited features, advantages and objects of the present invention will become apparent and can be understood in detail, more particular description of the invention, briefly summarized above, may be had by reference to the embodiment thereof which is illustrated in the appended drawings, which drawings form a part of this specification.

It is to be noted however, that the appended drawings illustrate only a typical embodiment of the invention and are therefore not to be considered limiting of its scope, for the invention may admit to other equally effective embodiments.

IN THE DRAWINGS

Figure 1:
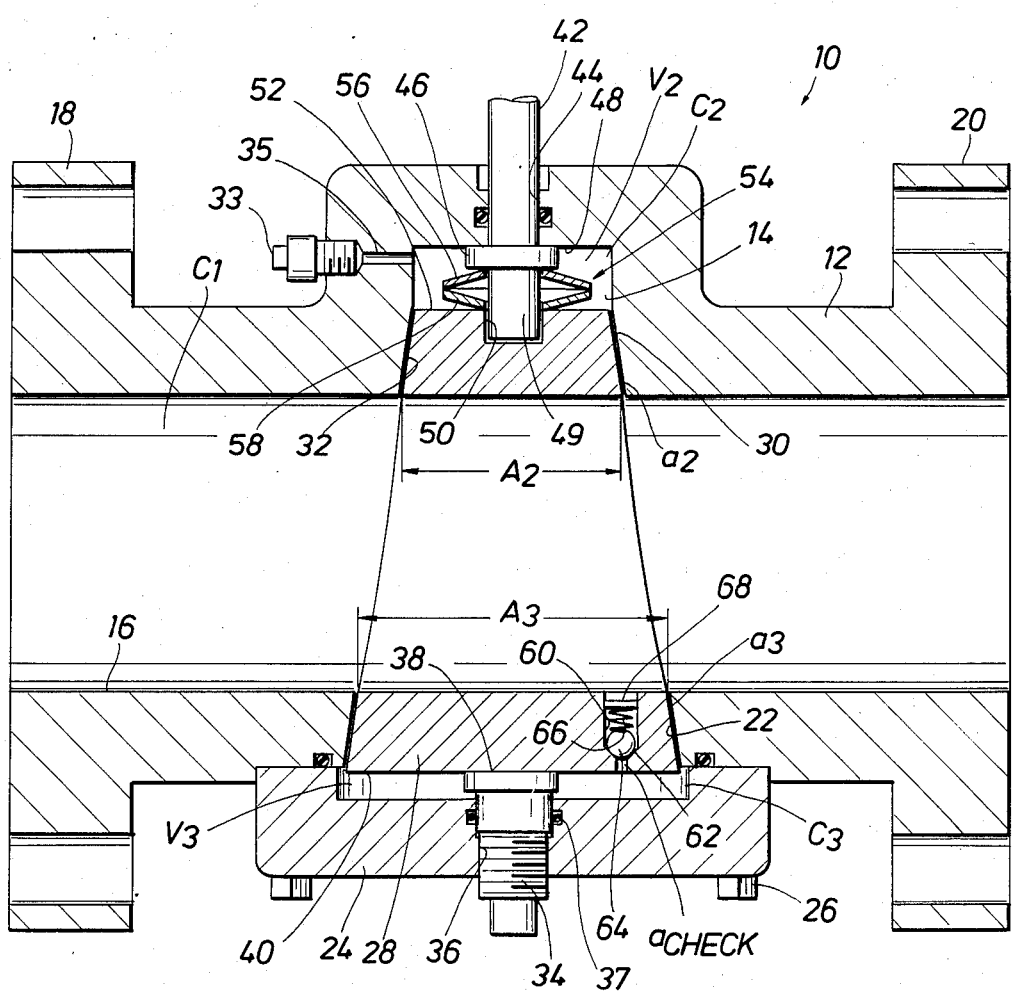

The present invention, both as to its organization and manner of operation, may best be understood by way of illustration and example of a certain embodiment when taken in conjunction with the accompanying drawings in which:

FIG. 1 is a sectional view of a tapered plug valve constructed in accordance with the present invention.

FIG. 2 is a graphical representation of internal valve chamber pressures versus time during a period of negative pressure transient.

FIG. 3 is a graphical representation of load on the plug member versus time due to a change in flow passage pressure and representing a negative pressure transient correlated with FIG. 2.

FIG. 4 is a graphical representation of internal valve chamber pressures versus time during a period of positive pressure transient.

FIG. 5 is a graphical representation similar to that of FIG. 3 but representing a positive pressure transient correlated with FIG. 4.

BRIEF DESCRIPTION OF THE PREFERRED EMBODIMENT

Referring now to the drawings and first to FIG. 1 a non-locking tapered plug valve is illustrated generally at 10 which incorporates a valve body structure 12 defining a frustoconical or tapered internal valve chamber 14. The valve body also defines a flow passage 16 intersecting the valve chamber and providing for flow of fluid through the valve. The valve body further defines connection flanges 18 and 20 for bolted connection of the valve to corresponding flanges of a flow line. Although flanges are shown for bolting connection, such as not intended to limit this invention, it being obvious that other means for connection of the valve body to a flow line may be utilized without departing from the spirit or the scope hereof.

The valve body defines an access opening 22 which is closed by means of a bonnet structure 24. The bonnet 24 may be secured to the body 12 by bolts or studs 26 or it may be secured to the body structure in any other suitable manner.

Within the valve chamber is located a frustoconical or tapered plug member 28 which defines a tapered external sealing surface 30 establishing mating sealing engagement with a correspondingly tapered internal sealing surface 32 defining a portion of valve chamber 14. For purposes of simiplicity the valve body and plug assembly are shown to be of the lubricated type; however it is intended that plug valves of nonlubricated character will be within the scope of this invention as well. A lubricant injector 33 is connected to the valve body at a lubricant injection passage 35 for injection of lubricant into the valve chamber. Internal lubricant channels (not shown) are defined for effective distribution of lubricant between the plug and body surfaces, as well as the upper and lower chambers $C_2$ and $C_3$.

At the lower or larger end of the valve mechanism is provided an adjustment screw 34 which is received by a threaded opening 36 in the bonnet member 24. The adjustment screw, which is sealed with respect to the bonnet 24 by a circular seal member 37, provides an upper support surface 38 which is in supportive engagement with the lower extremity 40 of the plug member 28. The adjustment screw 34 is utilized to achieve optimum positioning of the tapered sealing surface 30 of the plug member relative to the tapered internal sealing surface 32 of the valve body to thereby insure optimum sealing capability. As wear occurs during operation of the valve the adjustment screw may be manipulated while the valve is in service to shift the plug member 28 toward its apex taper (small extremity) to reestablish optimum sealing capability. The adjustment screw member 34 also functions as a stop to limit movement of the plug member toward its base (large extremity).

To impart rotation to the plug member 28 within the valve chamber 14 a valve stem 42 is provided which extends in sealed relation through a valve stem opening 44. The valve stem 42 is provided with an intermediate enlargement 46 which engages inner surface 48 of the valve chamber and functions as a stop to prevent the stem from being blown from the valve opening by pressure within the valve chamber. The valve stem is also provided with a drive portion 49 establishing driving relation with the plug member 28 such that, upon rotation of the valve stem 42, corresponding rotation of the plug member is achieved. The drive portion 49 is preferably of non-circular structure and is received within a corresponding non-circular drive receptable 50 defined in the apex extremity 52 of the plug member.

As mentioned above, at times temperature transients can cause temporary enlargement of the valve chamber due to metal expansion. When this occurs, especially if the valve is mounted with its base extremity above the apex extremity, the plug member has a tendency to move under the influence of gravity toward the apex extremity of the valve chamber. Upon subsequent cooling of the valve body, shrinkage of the metal can effectively reduce the dimension of the valve chamber causing the tapered internal sealing surface 32 to seize the plug member and prevent or retard its rotation. To prevent the possibility of this occurrence a compression spring assembly, illustrated generally at 54, is interposed between the enlargement 46 of the valve stem and the apex extremity 52 of the plug member. The spring assembly continuously urges the plug member 28 toward its base extremity. Under conditions where effective valve chamber enlargement occurs due to temperature transients, the force of the spring assembly will prevent the plug member from moving to a possible locking position within the valve chamber. If desired, the spring assembly may be formed by a pair of bellville springs 56 and 58 or, in the alternative, any other suitable compression spring system may be employed to maintain the plug member in engaged relation with the support surface 38 of the adjustment screw 34.

As discussed above, it is a primary feature of this invention to provide a tapered plug valve mechanism having an effective means to prevent plug taper locking due to both positive and negative pressure transients. According to the present invention such may be conveniently accomplished by providing controlled communication between the base portion of the valve chamber and the flow passage of the valve and correlating clearance area between the plug and valve chamber surfaces. The flow passage 16 effectively defines a chamber $C_1$. The plug member 28 cooperates with the valve chamber 14 to define an apex chamber $C_2$ at the small end of the valve chamber, having a volume $V_2$ and a base chamber $C_3$ at the large end of the valve chamber, having a volume $V_3$. A flow path exists at the interface clearance between the sealing surface of the plug and valve chamber. The interface clearance is further characterized as the clearance leakage path between the flow passage and the apex chamber $C_2$ which is represented by flow path area $a_2$ and the clearance leakage path between the flow passage and the base chamber $C_3$ which is represented by flow path area $a_3$. Flow path areas will differ principally due to the differing diameters resulting from the taper of the plug and body surfaces. Thence, if chambers $C_2$ and $C_3$ were of equal volume their pressure would become balanced with line pressure at differing rates because of the difference in clearance areas forming flow path areas $a_2$ and $a_3$.

Upon a sudden change in line pressure (positive or negative) such as would occur upon opening and closing of the valve or upon opening or closing of another valve in the line or upon rupture of the line either upstream or downstream, the chambers $C_2$ and $C_3$ would be at different pressures as compared to line pressure in chamber $C_1$. Fluid transfer in the clearance flow paths will immediately begin. After a period of time due to such fluid transfer, the pressure within chambers $C_2$ and $C_3$ will become balanced with the pressure in chamber $C_1$ defined by the flow passage of the valve.

Upon a sudden rise in pressure within the flow passage chamber $C_1$ a pressure differential will exist between flow passage pressure and the pressure of chambers $C_2$ and $C_3$. At this point it should be noted that the plug member 28 and its relationship with the valve chamber of the valve body defines pressure responsive areas $A_2$ and $A_3$ with area $A_3$ being larger than area $A_2$. Pressure $P_1$ within flow passage $C_1$, acting upon plug areas $A_2$ and $A_3$ will develop a resultant force acting to urge the plug member toward its larger extremity. As fluid transfer occurs past the plug member through the annular clearance area $a_2$ and $a_3$, the chambers $C_2$ and $C_3$ will, after a time, reach balanced pressure with flow passage pressure and conditions for hydraulic plug movement will no long exist. During the transient period, before pressure balancing occurs, the plug member can be under the influence of a pressure induced resultant force.

Plug movement toward its base extremity is not detrimental from the standpoint of plug locking because the plug is in effect being moved away from the apex taper of the valve chamber. Since the area of the plug member is greater at its base extremity $A_3$ than the area $A_2$ at the apex extremity thereof. A reduction in valve chamber pressure $P_1$ acting upon the area differential of the plug develops a resultant force urging the plug member towarde its apex extremity in conventional tapered plug valves. This occurrence can develop pressure induced plug locking. Such pressure induced plug locking is avoided in the present invention by the provision of a check valve to increase the rate of fluid flow from the base chamber to the flow passage.

POSITIVE PRESSURE TRANSIENT

During a pressure transient, the pressure increase in a chamber is governed by the volume "V" of the chamber and the respective clearance flow area "a" that allows the line pressure to equalize through the clearance flow area. Thus the pressure increase rate in any chamber is determined by the ratio $a/V$.

In order to ensure that the apex chamber pressure increase rate is faster than the base chamber pressure increase rate, the following relationship should be maintained during a positive pressure transient:

$$a_2/V_2 > a_3/V_3$$

Therefore, $$V_3 > V_2 \times (a_3/a_2) \qquad \text{Equation (1)}$$

The clearance flow areas $a_2$ and $a_3$ are fixed by the taper of the plug, the length, and the design clearance of the plug. For any given plug valve generally, the ratio $a_2/a_3$ is fixed, and is proportional to the diameter of the large end and the small end. Since this ratio is fixed or cannot be changed, the relationship of Equation (1) can be achieved by proportionately making the lower chamber volume larger to satisfy the relationship set forth in Equation (1).

When a pressure increase occurs in the flow passage chamber $C_1$, the ball check 64 is maintained at its sealed position by the force of spring 66 and by the force of pressure differential between line pressure and pressure within chamber $C_3$. Pressure equalization between line pressure and the pressure of chambers $C_2$ and $C_3$ thus occurs through the annular clearance areas $a_2$ and $a_3$ between the tapered plug and the sealing surface 32. Since the base plug area $A_3$ is larger than the apex plug area $A_2$, the result is a net downward acting pressure induced force on the plug member holding it securely against the adjustment screw. As pressure equalization takes place due to fluid transfer through the clearance between the plug member 28 and the tapered sealing surface 32 of the valve chamber, the apex chamber $C_2$ will reach pressure equilibrium before the base chamber $C_3$ by virtue of the larger volume at the base portion of the plug.

In the pressure/time curve of FIG. 4, line pressure $P_1$ is steady during the initial time period A and then is increased to an elevated pressure level during time period B. At time point $T_1$, pressures $P_2$ and $P_3$ within chambers $C_2$ and $C_3$ begin to increase with equalization flow occurring only in clearance areas $a_2$ and $a_3$. Pressure equalization is substantially complete at time point $T_3$. The time/force curve of FIG. 5 illustrates downward load on the plug member 28 during the pressure chamber of FIG. 4. At time point $T_1$, net downward force on the plug member is initiated due to pressure differential as pressures $P_2$ and $P_3$ equalize at different rates in chambers $C_2$ and $C_3$. The force is greatest where the pressure differential becomes greatest, as shown by the pressure differential arrow in FIG. 4. The net downward force on the plug then dissipates as the pressures in chambers $C_2$ and $C_3$ become equalized with line pressure. Thus, it can be seen that during the positive pressure transient, a downward force bias is maintained on the plug which prevents any plug movement toward the apex, thereby preventing tapered locking.

NEGATIVE PRESSURE TRANSIENT

During the negative pressure transient, if pressure equalization was again allowed to occur only through the clearance areas $a_2$ and $a_3$, it is obvious that the choice of $V_3 > V_2 \times (a_3/a_2)$ which was needed to maintain a faster pressure equalization rate between the top chamber and the line pressure, would now work against the design goal of keeping the plug force biased in the downward direction. The high pressure in the chambers $V_2$ and $V_3$ will start to decay during this negative transient, but it will decay at a slower rate in the lower chamber (as compared to the rate of decay in the upper chamber). Therefore, the plug would have experienced an upward force toward the apex, causing the plug to lock.

In order for the plug to avoid locking during such negative pressure transients, another flow area has, therefore, been introduced according to the teachings of this invention. This additional flow area is represented by the cross-sectional area of a pressure balancing passage controlled by a check valve and designated "$a_{check}$". Therefore, the rate of pressure equalization during the negative pressure transient is governed by the ratio $$(a_3 + a_{check})/V_3 \qquad \text{Equation (2)}$$

for the lower chamber, and by the ratio $$a_2/V_2 \qquad \text{Equation (3)}$$

for the upper chamber.

In order to ensure that the pressure equalization rate is higher in the lower chamber during the negative pressure transient, it must be ensured that:

$$(a_3 + a_{check})/V_3 > (a_2/V_2)$$

or $$V_3 < V_2(a_3 + a_{check})/a_2 \qquad \text{Equation (4)}$$

which can also be expressed as $$a_{check} > (V_3/V_2) \times a_2 - a_3 \qquad \text{Equation (5)}$$

Equations (1) and (5) define the selection of $V_2$, $V_3$ and $a_{check}$ $$V_3 > V_2(a_3/a_2)$$

and $$a_{check} > (V_3/V_2) \times a_2 - a_3$$

These pressure and force relationships are evident from the correlated graphical representations of FIGS. 2 and 3. During time period A the pressure $P_1$ is steady. At time point B a line pressure decrease begins and pressure again becomes steady at its lower pressure value. At point B fluid transfer from chambers $C_2$ and $C_3$ will begin as evidenced by pressure decay curves $P_2$ and $P_3$, with rates of pressure equalization differing according to the above equations. The pressure differential between pressures $P_2$ of chamber $C_2$ and $P_3$ of chamber $C_3$ will be at its greatest at time point D as evidenced by the pressure differential arrow.

As is evident from FIG. 3, the downward force acting on the plug member during the negative pressure transient of FIG. 2 is shown in correlated manner. The downward force (acting toward the large end of the plug and considered in absence of spring preload force) begins at point $T_1$ when the pressure change occurs. This force increases to its maximum near point $T_2$ and then gradually returns to zero as the pressures of chambers $C_2$ and $C_3$ become balanced with the lowered line pressure at $T_3$.

In the preferred embodiment disclosed herein the plug member 28 is formed to define a pressure equalization passage 60 defining flow passage $a_{check}$ and forming an internal valve seat 62 against which is seated a check valve 64. The check valve is maintained in seated relation with the valve seat 62 by means of a compression spring 66 which is secured within the passage 60 by means of a spring retainer element 68. As pressure $P_1$ increases within the flow passage $C_1$ of the valve such pressure will be prevented from free communication with chamber $C_3$ by the check valve member 64. Flow passage pressure $P_1$ acting upon areas $A_2$ and $A_3$ will, due to the area differential, develop a resultant force imparting downward bias to the plug member 28. Under conditions of negative pressure transient, when flow passage pressure $P_1$ is reduced, pressure within the base chamber $C_3$ of the valve will be quickly vented past the check valve 64 into the flow passage, causing chamber pressure $P_3$ to quickly equalize with line pressure $P_1$. During the transient period, pressure within the apex chamber $C_2$ of the valve will act upon the pressure responsive area $A_2$ defined by the apex extremity 52 of the plug member thereby developing a pressure induced force acting upon the plug member 28 in a direction toward the base extremity thereof. During the transient period, pressure in chamber $C_2$ will continuously decay and the resultant force acting on the plug member will continuously diminish until it becomes substantially zero.

Obviously, downward movement of the plug member 28 beyond the position shown in FIG. 1 cannot occur since the adjustment screw 34 provides a downward stop in the form of support surface 38 whether the plug member is urged downwardly by the compression spring system 54 or by the hydraulic influence of positive or negative hydraulic pressure transients. The net result is that the plug member will always remain in a properly adjusted position for optimum sealing. There will be no tendency for the plug member to be urged in the direction of its apex taper and thus no tendency for taper locking to occur. Even further, due to temperature transients, expansion and contraction of the valve chamber will not induce plug taper locking since the plug member will be urged by the compression spring system 54 to the position shown in FIG. 1. If the valve is positioned with the large end of the plug member located above the small end, the force spring 56-58 will prevent gravitational movement of the plug toward its apex taper.

When tapered plug valves are utilized in gas service, the taper locking problem is particularly difficult to prevent. This is because of the absence of fluid in the sealing chambers eliminates the helpful effects of "fluid" spring or damping which would otherwise be available to restrain pressure induced plug movement. Furthermore, if the quantity of sealant or lubricant is diminished or absent altogether, the beneficial damping effects normally provided by the sealing and lubricating material will not be available. This further exacerbates the taper locking problem. Computer aided simulation has shown that under these worse-case circumstances, a spring preload is desirable to help prevent plug movement. In the present invention, this preload is provided by spring members 56 and 58 which simultaneously urges the plug member toward its base and urges the valve stem in the opposite direction against the inner surface 48 of the valve chamber. In combination with proper sizing of the apex and base chambers $C_2$ and $C_3$ and proper flow capacity of the ball check valve mechanism, the magnitude of spring preload can be minimized, thereby maintaining valve operating torque at acceptably low levels. A further beneficial effect of the spring preload is to prevent taper locking due to thermal transients or to prevent gravitational movement of the plug member toward its apex taper due to its own weight when the valve is installed with the base portion of the plug facing upwardly.

In view of the foregoing, it is respectfully submitted that a non-locking tapered plug valve mechanism has been provided herewith which accomplishes all of the features and objects hereinabove said forth together with other features which are inherent in the valve mechanism itself. It will be understood that certain combinations and subcombinations of this invention are of utility and may be employed without reference to other features and subcombinations. This is contemplated by and is within the scope of the present invention.

What is claimed is:

1. A non-pressure-locking tapered plug valve comprising:
    (a) a valve body forming a tapered valve chamber and flow passage means in communication with said valve chamber;
    (b) a tapered plug member defining a first axial extremity and a second axial extremity smaller than said first axial extremity, said tapered plug member being rotatably positioned within said valve chamber and forming a flow port communicating with said flow passage means in the open position thereof and forming a blocking portion blocking flow through said flow passage means in the closed position of said plug member, said tapered plug member cooperating with said valve body to define a first chamber at one end of said plug member and a second chamber at the opposite end of said plug member;
    (c) means controlling the rate of pressure equalization within said first and second chambers such that said first chamber is equalized with line pressure at a faster rate than said second chamber during a negative line pressure transient and said second chamber pressure is equalized with line pressure at a faster rate than said first chamber during a positive line pressure transient; and
    (d) means for imparting rotational movement to said tapered plug member about the longitudinal axis thereof for opening and closing said valve.

2. A non-pressure-locking tapered plug valve as recited in claim 1, wherein:
    said controlling means comprises a check valve line permitting flow from said first chamber to said flow passage means.

3. A non-pressure-locking tapered plug valve as recited in claim 1, wherein:
    (a) the volume of said first chamber is greater than the volume of said second chamber; and
    (b) clearance areas are defined between said plug member and said valve body, the clearance area between said flow passage means and said first chamber is greater than the clearance area between said flow passage means and said second chamber.

4. A non-pressure-locking tapered plug valve as recited in claim 1, wherein:
    (a) said first and second chambers establish chamber volumes $V_3$ and $V_2$, respectively;

(b) clearance areas are defined between said tapered plug member and said valve body and establish clearance area $a_2$ between said flow passage and chamber volume $V_2$ and clearance area $a_3$ between said flow passage and chamber volume $V_3$; and (c) the ratio of said chamber volumes $V_2$ and $V_3$ is determined by the equation:

$$V_3 > V_2 \times (a_3/a_2)$$

5. A non-pressure-locking tapered plug valve as recited in claim 1, wherein:

said controlling means comprises unidirectional flow passage area means $a_{check}$ defined between said first chamber volume $V_3$ to said flow passage means and being established by the ratio equation:

$$a_{check} > (V_3/V_2) \times a_2 - a_3$$

wherein $V_2$ represents the volume of said second chamber, and $a_2$ and $a_3$ represent clearance areas between said tapered plug member and said valve body, $a_2$ representing the clearance area between said flow passage means and said chamber volume $V_2$ and $a_3$ representing the clearance area between said flow passage means and said chamber volume $V_3$.

6. A non-pressure-locking tapered plug valve as recited in claim 1, wherein:

(a) said plug valve defines equalizing passage means communicating said flow passage means and said first chamber, said equalizing passage means defining a valve seat; and (b) a check valve element is disposed within said equalizing passage means for sealing engagement with said valve seat, said check valve element permitting unidirectional flow of fluid from said first chamber to said flow passage means.

7. A non-pressure-locking tapered plug valve as recited in claim 6, including:

means urging said check valve element into seated relation with said valve seat and yielding responsive to greater pressure within said second chamber in comparison with pressure in said flow passage means to vent pressure to said flow passage means.

8. A non-pressure-locking tapered plug valve as recited in claim 1, wherein:

said equalizing passage means is defined by said plug member.

9. A non-pressure-locking tapered plug valve as recited in claim 1, including:

means mechanically urging said tapered plug member toward the larger extremity thereof.

10. A non-pressure-locking tapered plug valve as recited in claim 9, wherein:

(a) said means for imparting rotational movement to said tapered plug member comprises a valve stem extending in sealed relation through said body means and establishing driving relation with said tapered plug member; and (b) said urging means also urges said valve stem in a direction away from said tapered plug member.

11. A non-pressure-locking tapered plug valve as recited in claim 1, wherein:

(a) said controlling means is defined by an equalization passage communicating said flow passage means and said first chamber, said equalization passage having a check valve therein permitting unidirectional flow from said first chamber to said flow passage means; and (b) the relative volumes of said first and second chambers and the area defined by said check valve are such that under conditions of negative pressure transient, and assuming the same pressure equalization rate in clearance areas defined between said tapered plug member and valve body and between said flow passage means and said first and second chambers, said first chamber reaches equilibrium with flow passage pressure prior to said second chamber and any pressure induced resultant force acting on said tapered plug member will be directed toward the larger extremity of said plug member.

12. A non-pressure-locking tapered plug valve, comprising:

(a) a valve body defining a tapered valve chamber and forming flow passage means in communication with said valve chamber;

(b) a tapered plug member defining large and small axial ends and being rotatably positioned with said valve chamber and forming a flow port registering with said flow passage means in the open position of said tapered plug member, said tapered plug member cooperating with said valve body to define first and second chambers at the respective large and small axial ends of said tapered plug member; and (c) plug taper lock preventing means controlling the rate of pressure equalization within said first and second chambers such that said second chamber is equalized with pressure in said flow passage means at a faster rate than said first chamber, causing the development of a positive hydraulic pressure transient induced force on said tapered plug member acting toward said large end thereof responsive to a rise in line pressure and said first chamber is equalized with pressure in said flow passage means at a faster rate than said second chamber during a decrease in flow passage pressure, causing the development of a negative hydraulic pressure transient induced force on said tapered plug member acting toward said large end thereof responsive to a decrease in line pressure.

13. A non-pressure-locking tapered plug valve as recited in claim 12, wherein said plug taper lock preventing means comprises:

(a) unequal volumes defined by said chambers and being of greater volume at said large extremity of said tapered plug member; and (b) equalization clearance areas between said flow passage means and said chambers, said equalization clearance area being greater between said flow passage and the chamber at the large extremity of said tapered plug member.

14. A non-pressure-locking tapered plug valve as recited in claim 13, wherein said plug taper lock preventing means further includes:

means permitting unidirectional flow of pressure from said chamber at the large end of said tapered plug member to said flow passage means.

15. A non-pressure-locking tapered plug valve as recited in claim 12, wherein:

(a) said tapered plug member cooperates with said valve body to define a first chamber at the large end of said tapered plug member and a second chamber at the small end of said tapered plug member; and (b) said plug lock preventing means provides free communication of pressure from said first chamber to said flow passage means responsive to decrease in flow passage pressure permitting pressure induced resultant force on said tapered plug member toward said large end thereof during pressure equalization of said second chamber with flow passage pressure, said plug lock preventing means preventing free communication of pressure from said flow passage means to said first chamber means during pressure equalization of said first and second chambers responsive to rise in flow passage pressure.

16. A non-pressure-locking tapered plug valve as recited in claim 15, wherein:
said first and second chambers are of such relative volumetric dimension that under conditions of negative pressure transient, and assuming the same leakage rate in clearance areas defined between said tapered plug member and said valve body and between said flow passage means and said first and second chambers, said first chamber reaches equilibrium with flow passage pressure prior to said second chamber and any resultant force acting on said tapered plug member will be directed toward the larger extremity of said tapered plug member.

* * * * *